(12) United States Patent
Gagnon et al.

(10) Patent No.: US 10,952,149 B2
(45) Date of Patent: Mar. 16, 2021

(54) METHOD AND ELECTRONIC DEVICE FOR SECURED COMMISSIONING

(71) Applicant: Distech Controls Inc., Brossard (CA)

(72) Inventors: Dominic Gagnon, St-Bruno-de-Montarville (CA); Xavier Rousseau, Lyons (FR)

(73) Assignee: DISTECH CONTROLS INC., Brossard (CA)

( * ) Notice: Subject to any disclaimer, the term of this patent is extended or adjusted under 35 U.S.C. 154(b) by 0 days.

(21) Appl. No.: 16/437,585

(22) Filed: Jun. 11, 2019

(65) Prior Publication Data

US 2019/0394731 A1  Dec. 26, 2019

Related U.S. Application Data

(60) Provisional application No. 62/687,475, filed on Jun. 20, 2018.

(51) Int. Cl.
| | |
|---|---|
| *H04W 12/00* | (2009.01) |
| *H04W 52/14* | (2009.01) |
| *H04W 52/38* | (2009.01) |
| *H04L 12/24* | (2006.01) |
| *H04L 29/06* | (2006.01) |

(52) U.S. Cl.
CPC ....... *H04W 52/143* (2013.01); *H04L 41/0806* (2013.01); *H04L 41/0813* (2013.01); *H04L 63/083* (2013.01); *H04W 12/003* (2019.01); *H04W 52/38* (2013.01)

(58) Field of Classification Search
CPC . H04W 52/143; H04W 12/003; H04W 52/38; H04L 41/0813; H04L 63/083; H04L 41/0806
See application file for complete search history.

(56) References Cited

U.S. PATENT DOCUMENTS

| | | | |
|---|---|---|---|
| 2006/0056636 A1* | 3/2006 | Schrum, Jr. ......... | H04L 63/0428 380/273 |
| 2006/0111105 A1* | 5/2006 | Bajar .................... | H04W 12/06 455/435.1 |
| 2006/0239217 A1* | 10/2006 | Hassan ............... | H04L 63/0492 370/311 |
| 2012/0139698 A1* | 6/2012 | Tsui ...................... | G08C 17/02 340/5.54 |
| 2013/0229930 A1* | 9/2013 | Akay ................. | H04W 52/0245 370/252 |
| 2014/0362991 A1* | 12/2014 | Ebrom .................... | H04L 63/18 380/270 |
| 2016/0373258 A1* | 12/2016 | Bone ..................... | G06F 9/4401 |

\* cited by examiner

*Primary Examiner* — Dong-Chang Shiue
(74) *Attorney, Agent, or Firm* — RatnerPrestia

(57) ABSTRACT

The present method and electronic device are adapted for secured commissioning. A generic password is stored in memory of the electronic device, and a transmission power of the electronic device is set to a reduced transmission power. The electronic device receives a commissioning request including the generic password and a specific password. The generic password is replaced in the memory of the electronic device by the specific password, and the transmission power of the electronic device is increased to full transmission power.

16 Claims, 3 Drawing Sheets

METHOD AND ELECTRONIC DEVICE FOR SECURED COMMISSIONING

RELATED APPLICATIONS

This application claims priority to U.S. Provisional Application No. 62/687,475, filed Jun. 20, 2018 entitled "METHOD AND ELECTRONIC DEVICE FOR SECURED COMMISSIONING," the disclosure of which is entirely incorporated herein by reference.

TECHNICAL FIELD

The present disclosure relates to the field of electronic devices, and more precisely to a method and an electronic device adapted for secured commissioning.

BACKGROUND

Environment control systems typically include multiple components. In the past, the components of an environment control system were connected by wires. With the growing popularity and availability of new wireless technologies, the components of environment control systems can now communicate wirelessly.

To prevent wireless tampering, the components of the environment control system are usually provided with a generic password by the manufacturer. A technician installing the components of the environment control system is expected to change the generic password, so as to prevent undesired wireless tampering of the settings, configuration and operation of the components of the environment control system, and the environment control system as a whole.

However, installation often requires the technician to modify the generic password of tens of components, and in some buildings, hundreds of components. Forgetting to change the generic password of only one component in a whole building is sufficient to create a security breach of the overall environment control system.

A similar problem exists with consumer products communicating wirelessly, e.g. wireless consumer products. Often times, consumers will actuate the wireless consumer product, and if they do not change the generic password upon initial actuation, they forget to change the generic password. Omitting to change the generic password creates a wireless entry point to the consumer interconnected wireless electronic devices, which may seriously impact security.

As more and more electronic devices are designed to be wirelessly interconnected, there is a need for a new method and electronic device which ensures secured commissioning of electronic devices.

SUMMARY

According to a first aspect, the present disclosure relates to a method for securely commissioning a electronic device. The method comprises storing a generic password in memory of the electronic device and setting a transmission power of the electronic device to a reduced transmission power. The method further comprises receiving at the electronic device a commissioning request, wherein the commissioning request includes the generic password and a specific password. The method also comprises verifying that the generic password received in the commissioning request corresponds to the generic password stored in the memory of the electronic device, and if the generic password received in the commissioning request corresponds to the generic password stored in the memory of the electronic device replacing in the memory of the electronic device the generic password with the specific password and increasing the transmission power of the electronic device to full transmission power.

In accordance with a particular aspect, the reduced transmission power is less than 25% of the full transmission power.

In accordance with another particular aspect, the commissioning request uses any of the following technology: Bluetooth, Bluetooth Low Energy, Wi-Fi.

In accordance with yet another particular aspect, the method further comprises broadcasting a message at the reduced transmission power.

In accordance with another particular aspect, the specific password comprises at least 6 characters.

In accordance with yet another particular aspect, the generic password stored in memory of the electronic device is encrypted, the received commissioning request includes the encrypted generic password and the specific password is encrypted; and the encrypted generic password is replaced in the memory of the electronic device by the encrypted specific password.

In accordance with another particular aspect, the generic password and the specific password are encrypted using one of the followings: a symmetric key or a public key.

In accordance with another particular aspect, the method further comprises authenticating a sender of the commissioning request before replacing in the memory of the electronic device the generic password with the specific password and increasing the transmission power of the electronic device to full transmission power.

According to a second aspect, the present disclosure relates to an electronic device comprising memory storing a generic password. The electronic device further comprises a transceiving unit for transmitting at a reduced transmission power and for receiving a commissioning request, the commissioning request including the generic password and a specific password. The electronic device further comprising a processor for verifying that the generic password received in the commissioning request corresponds to the generic password stored in the memory; the processor also replacing the generic password stored in the memory with the specific password when the generic password received in the commissioning request corresponds to the generic password stored in the memory; and the processor further increasing the reduced transmission power of the transceiving unit to full transmission power upon replacing the generic password stored in the memory with the specific password.

In accordance with another particular aspect, the reduced transmission power is less than 25% of the full transmission power.

In accordance with yet another particular aspect, the transceiving unit transmits using any of the following technology: Bluetooth, Bluetooth Low Energy, Wi-Fi.

In accordance with another particular aspect, the transceiving unit wirelessly transmits a broadcast message at the reduced transmission power.

In accordance with another further particular aspect, the specific password comprises at least 6 characters.

In accordance with yet another particular aspect, the generic password stored in the memory is encrypted, the received commissioning request includes the encrypted generic password and the specific password is encrypted, and the encrypted generic password is replaced in the memory by the encrypted specific password.

In accordance with a further particular aspect, the generic password and the specific password are encrypted using one of the followings: a symmetric key or a public key.

In accordance with yet another particular aspect, the processor authenticates a sender of the commissioning request before replacing the generic password stored in the memory with the specific password and before increasing the reduced transmission power of the transceiving unit to full transmission power.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address the secure commissioning of electronic devices.

The following terminology is used throughout the present disclosure:

Electronic device: any device which wirelessly communicates with one or several other electronic devices, the electronic device may be any of the following: a consumer product, an environment control system, an environment control component (actuator, controller, light, sensor, thermostat, etc.), a mobile device, etc.

Generic password: password which is factory set. A generic password is either a preset password, or a lack of password.

Secure commissioning: bringing a newly actuated electronic device into secure working condition.

Specific password: password which is different from the generic password, the specific password may for example comprise at least six (6) characters.

Figure 1:
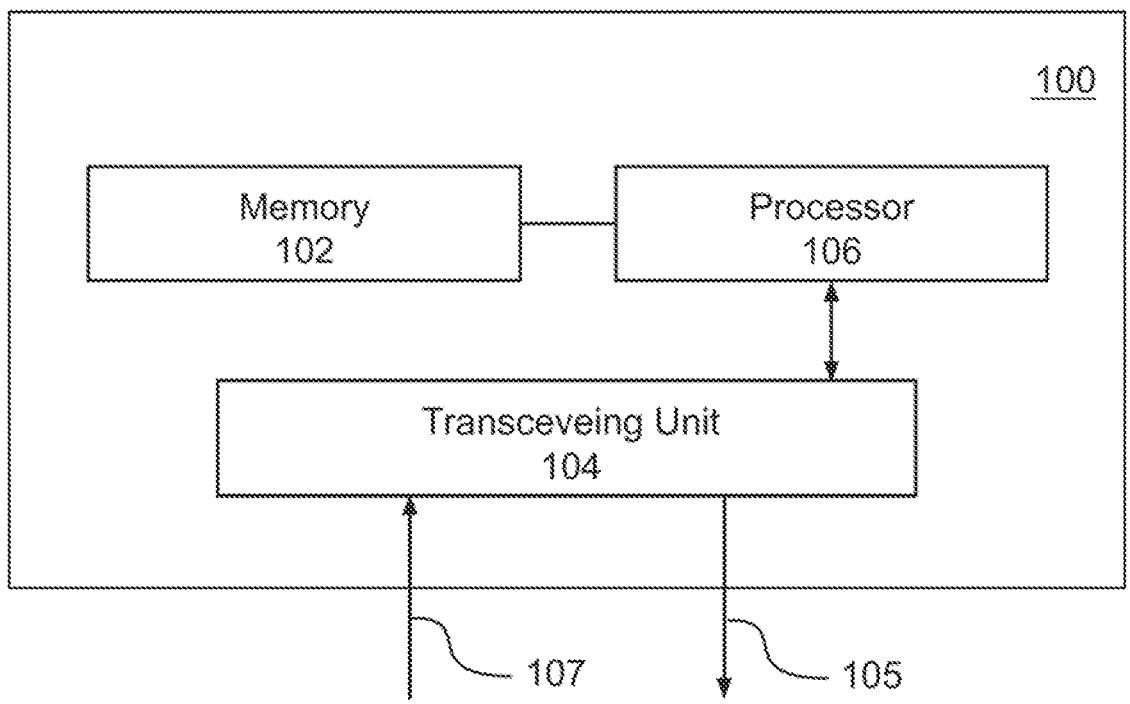
FIG. 1 is a block diagram of an electronic device adapted for secure commissioning.

Referring now to FIG. 1, there is presented a block diagram of an electronic device 100 adapted for ensuring secure commissioning. The electronic device 100 comprises memory 102, a transceiving unit 104 and a processor 106.

The memory 102 stores a generic password. The generic password is typically stored in the memory 102 by the manufacturer, and all electronic devices 100 produced by the same manufacturer could have the same generic password. Alternatively, the manufacturer could use different generic passwords for each type of electronic devices produced, each type of electronic devices produced for each client, or any other combination which allows simple management of generic passwords. The memory 102 is a non-volatile memory.

The transceiving unit 104 transmits and receives messages using any of the following technology: Bluetooth, Bluetooth Low Energy (BLE), Wi-Fi, etc.

Before completion of a secure commissioning of the electronic device 100, the transceiving unit 104 transmits at a reduced transmission power. The reduced transmission power may be for example less than 25% of the full transmission power. By selecting a reduced transmission power which is substantially lower than the full transmission power, the electronic device 100 is only detectable by closely proximate electronic devices until it is securely commissioned. Transmitting at the reduced transmission power prevents detection of the electronic device 100 by other electronic devices until the electronic device is securely commissioned, thereby substantially reducing the risks of tampering. Therefore, the transceiving unit 104 transmits a broadcast message 107 at the reduced transmission power, until the electronic device is securely commissioned.

The secured commissioning of the electronic device 100 starts by receiving at the transceiving unit 104a commissioning request 105. Throughout the present specification, the expression commissioning request 105 is used to refer to any type of message which may be used to securely commission the electronic device 100, such as for example, a password request change, or any other type of message which may be used to perform secure commissioning of the electronic device 100. The commissioning request 105 comprises the generic password and a specific password. The specific password is any password which is different from the generic password, and which is not an empty password. The specific password may be selected by a user or a technician performing commissioning of the electronic device 100. The received commissioning request 105 is forwarded to the processor 106.

The processor 106 verifies that the generic password received in the commissioning request 105 corresponds to the generic password stored in the memory 102. If the generic password received in the commissioning request 105 corresponds to the generic password stored in the memory 102, the processor 106 replaces the generic password stored in the memory 102 with the specific password received in the commissioning request 105. The processor 106 further increases the reduced transmission power of the transceiving unit 104 to full transmission power upon replacing the generic password stored in the memory with the specific password.

By transmitting at the reduced transmission power until the generic password is replaced by the specific password, the risks of wireless tampering are substantially reduced, as the electronic device 100 is detectable only by devices which are in very close proximity. For example, the reduced transmission power could be selected so that the electronic device 100 is only detectable by devices which are located within one meter of the electronic device 100. Furthermore, as the electronic device 100 cannot be detected by other devices which are not within the transmission range of the reduced transmission power, a user or technician actuating the electronic device 100 has an additional incentive to change the generic password, therefore ensuring a secured commissioning.

In a particular aspect and to further increase the security provided by the present secured commissioning, the processor 106 is further adapted for encrypting and decrypting communications with the mobile device. The encryption could include encrypting and decrypting the commissioning request 105 or encrypting and decrypting a payload of the commissioning request 105. Furthermore, the generic password stored in the memory 102 may be encrypted, and the received commissioning request 105 could include the encrypted generic password and the encrypted specific password. The processor 106 then replaces the encrypted generic password stored in the memory 102 with the encrypted specific password. The encryption may be based for example on a symmetric key or a public key.

The processor 106 may further authenticate a sender of the commissioning request 105 before replacing the generic password stored in the memory 102 with the specific password, and before increasing the transmission power of the transceiving unit 104 to full transmission power.

Figure 2A:
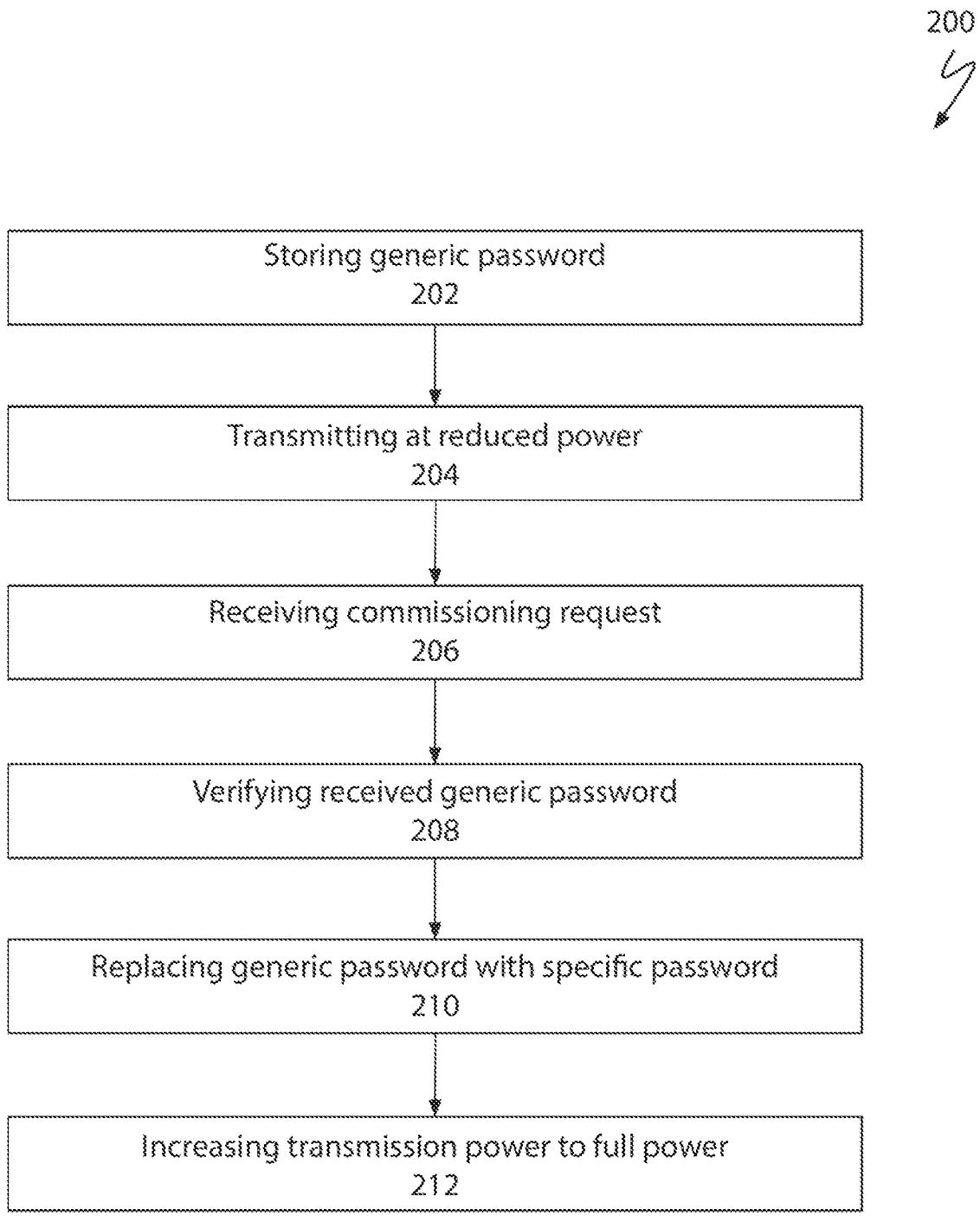
FIG. 2A is a flow chart of a method for performing secure commissioning of an electronic device.

Reference is now made to FIG. 2A which is a flow chart of a method for performing secure commissioning of an electronic device 100.

The method 200 starts with storing 202a generic password in memory 102 of the electronic device 100. The method continues with setting a transmission power of the electronic device 100 to a reduced transmission power (for example less than 25% of the full transmission power) and transmitting 204a broadcast message at the reduced transmission power. The method continues with receiving 206 at the electronic device 100a commissioning request comprising the generic password and the specific password. The commissioning request uses any of the following technology: Bluetooth, Bluetooth Low Energy, Wi-Fi. The method then verifies 208 whether the generic password received in the commissioning request corresponds to the generic password stored in the memory 102. Once verification of the generic password is completed and positive, the method continues with replacing 210 in the memory 102 of the electronic device 100 the generic password with the specific password received in the commissioning request. The method continues with increasing 212 the transmission power of the transceiving unit 104 to full transmission power.

To further increase the security provided by the present secured commissioning method, the generic password stored in the memory 102 of the electronic device 100 may be encrypted. Furthermore, the received commissioning request may be encrypted as a whole, or the generic password and the specific password may be encrypted. The encrypted generic password is replaced in the memory 102 of the electronic device 100 by the encrypted specific password. The encryption may be performed using a symmetric key or a public key.

Figure 2B:
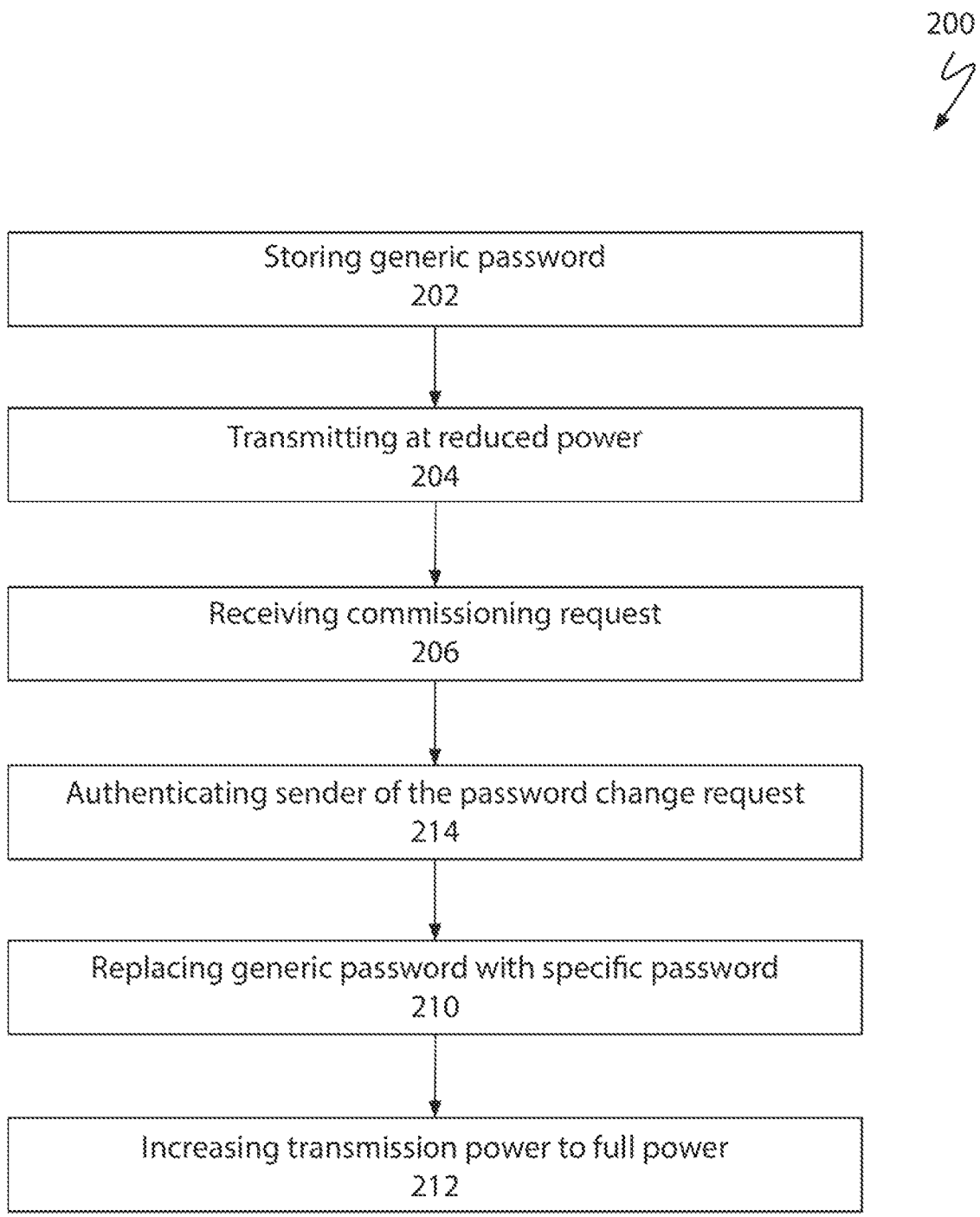
FIG. 2B is a flow chart of an alternative method for performing secure commissioning of an electronic device.

Reference is now made to FIG. 2B, which is a flow chart of an alternative method for performing secure commissioning of the electronic device 100. The method depicted on FIG. 2B is further comprises authenticating 214a sender of the commissioning request instead of, or in addition to, verifying 208 the received generic password.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for securely commissioning an electronic device, the method comprising:
keeping the electronic device transmitting at a reduced transmission power until a generic password stored in a memory of the electronic device is replaced;
receiving at the electronic device a commissioning request, the commissioning request including a specific password;
verifying that the commissioning request includes the generic password;
when the commissioning request includes the generic password:
the electronic device replaces in the memory the generic password with the specific password; and
when the generic password in the memory is replaced by the specific password:
the electronic device increases the transmission power to full transmission power.

2. The method of claim 1, wherein the reduced transmission power is less than 25% of the full transmission power.

3. The method of claim 1, wherein the commissioning request uses any of the following technology: Bluetooth, Bluetooth Low Energy, Wi-Fi.

4. The method of claim 1, further comprising broadcasting a message at the reduced transmission power.

5. The method of claim 1, wherein the specific password comprises at least 6 characters.

6. The method of claim 1, wherein:
the generic password stored in the memory of the electronic device is encrypted;
the generic password in the received commissioning request is encrypted and the specific password in the received commissioning request is encrypted; and
the encrypted generic password is replaced in the memory of the electronic device by the encrypted specific password.

7. The method of claim 6, wherein the generic password stored in the memory of the electronic device, the generic password in the received commissioning request and the specific password in the received commissioning request are encrypted using one of the followings: a symmetric key or a public key.

8. The method of claim 1, further comprising authenticating a sender of the commissioning request before replacing in the memory of the electronic device the generic password with the specific password and increasing the transmission power of the electronic device to full transmission power.

9. An electronic device comprising:
memory storing a generic password;
a transceiving unit capable of transmitting at a reduced transmission power and at a full transmission power; and
a processor for:
keeping the transceiving unit transmitting at the reduced transmission power until the generic password stored in the memory is replaced;
receiving via the transceiving unit a commissioning request, the commissioning request including a specific password;
verifying that the commissioning request includes the generic password;
when the commissioning request includes the generic password:
replacing the generic password stored in the memory with the specific password; and
when the generic password in the memory is replaced by the specific password:
increasing the transmission power of the transceiving unit to the full transmission power.

10. The electronic device of claim 9, wherein the reduced transmission power is less than 25% of the full transmission power.

11. The electronic device of claim 9, wherein the transceiving unit transmits using any of the following technology: Bluetooth, Bluetooth Low Energy, Wi-Fi.

12. The electronic device of claim 9, wherein the transceiving unit transmits a broadcast message at the reduced transmission power.

13. The electronic device of claim 9, wherein the specific password comprises at least 6 characters.

14. The electronic device of claim 9, wherein:
the generic password stored in the memory is encrypted;
the generic password in the received commissioning request is encrypted and the specific password in the received commissioning request is encrypted; and
the encrypted generic password is replaced in the memory by the encrypted specific password.

15. The electronic device of claim 14, wherein the generic password stored in the memory, the generic password in the received commissioning request and the specific password in the received commissioning request are encrypted using one of the followings: a symmetric key or a public key.

16. The electronic device of claim 14, wherein after receipt of the commissioning request including the encrypted generic password and the encrypted specific password, the processor authenticates a sender of the commissioning request before replacing the generic password stored in the memory with the specific password and before increasing the transmission power of the transceiving unit to full transmission power.

* * * * *